United States Patent
Imamura et al.

(10) Patent No.: US 10,334,028 B2
(45) Date of Patent: Jun. 25, 2019

(54) APPARATUS AND METHOD FOR PROCESSING DATA

(71) Applicant: FUJITSU LIMITED, Kawasaki-shi, Kanagawa (JP)

(72) Inventors: Nobutaka Imamura, Yokohama (JP); Hidekazu Takahashi, Kawasaki (JP); Toshiaki Saeki, Kawasaki (JP); Miho Murata, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 156 days.

(21) Appl. No.: 15/467,477

(22) Filed: Mar. 23, 2017

(65) Prior Publication Data

US 2017/0295221 A1    Oct. 12, 2017

(30) Foreign Application Priority Data

Apr. 11, 2016    (JP) .................................. 2016-079154

(51) Int. Cl.
*H04L 29/08*    (2006.01)
*G06F 9/50*    (2006.01)

(52) U.S. Cl.
CPC ............ *H04L 67/10* (2013.01); *G06F 9/5083* (2013.01)

(58) Field of Classification Search
CPC ................................ H04L 67/10; G06F 9/5083
See application file for complete search history.

(56) References Cited

U.S. PATENT DOCUMENTS

| | | | | |
|---|---|---|---|---|
| 9,262,216 | B2 * | 2/2016 | Bodik | G06F 9/4887 |
| 9,996,662 | B1 * | 6/2018 | Florissi | G06F 19/22 |
| 10,122,806 | B1 * | 11/2018 | Florissi | H04L 67/22 |
| 10,193,753 | B1 * | 1/2019 | Tabet | H04L 41/0843 |
| 2009/0276771 | A1 * | 11/2009 | Nickolov | G06F 9/4856 717/177 |
| 2011/0179100 | A1 | 7/2011 | Kawai | |
| 2012/0089968 | A1 | 4/2012 | Varadarajan et al. | |
| 2014/0059552 | A1 * | 2/2014 | Cunningham | G09G 5/00 718/102 |

(Continued)

FOREIGN PATENT DOCUMENTS

| | | | |
|---|---|---|---|
| CN | 102567312 A | * | 7/2012 |
| CN | 103491024 A | * | 1/2014 |

(Continued)

*Primary Examiner* — Kostas J Katsikis
(74) *Attorney, Agent, or Firm* — Staas & Halsey LLP (57) ABSTRACT

An apparatus for processing data includes a processor configured to acquire size information on a size of first result data from a first node. The first result data is generated in first distributed processing executed by the first node on a first part of first input data for the first distributed processing executed by a plurality of nodes. The processor is configured to acquire data arrangement information for second distributed processing executed by the plurality of nodes. The processor is configured to generate a data arrangement instruction on basis of the size information and the data arrangement information. The data arrangement instruction defines an arrangement pattern of second result data generated in the first distributed processing executed by the plurality of nodes and stored in the plurality of nodes as the second input data. The processor is configured to transmit the data arrangement instruction to the plurality of nodes.

6 Claims, 9 Drawing Sheets

(56) References Cited

U.S. PATENT DOCUMENTS

2015/0092550 A1\*  4/2015  Christian ................ H04L 47/31
                                                    370/235
2016/0063191 A1\*  3/2016  Vesto .................... G06F 19/324
                                                    705/2

FOREIGN PATENT DOCUMENTS

| JP | 2011013820 A | \* | 1/2011 |
| JP | 2011-150503 | | 8/2011 |
| JP | 2013-545169 | | 12/2013 |

\* cited by examiner

APPARATUS AND METHOD FOR PROCESSING DATA

CROSS-REFERENCE TO RELATED APPLICATION

This application is based upon and claims the benefit of priority of the prior Japanese Patent Application No. 2016-079154, filed on Apr. 11, 2016, the entire contents of which are incorporated herein by reference.

FIELD

The embodiments discussed herein are related to an apparatus and a method for processing data.

BACKGROUND

As the cloud computing is actively distributed, a distributed processing system is being used, which distributes big data among a plurality of servers, and executes processing on the distributed big data. The big data is a large amount of data stored on a cloud. This system is also used to analyze the big data for use in various services. For example, customers' taste on purchasing products may be analyzed by analyzing point card attribute information and Point of Sale (POS) system data.

As an example of such a distributed processing system, Hadoop® is known, which adopts Hadoop Distributed File System (HDFS) and MapReduce as basic technologies. HDFS is a file system which distributes and stores data in a plurality of servers. MapReduce is a mechanism for distributing and processing data on HDFS in units called tasks, and executes a Map process, a Shuffle sort process, and a Reduce process. As an analysis process, for example, Message Passing Interface (MPI) is known, which is a communication library for parallel calculation.

For example, a distributed processing system that executes a MapReduce process and an MPI process has a master server operated as a name node and a job tracker, and a slave server operated as a task tracker and a data node as well as executing the MPI process. In the MapReduce process, each slave server executes the Map process, the Shuffle sort process, and the Reduce process on an input file in the comma separated value (CSV) format, converts the input file into a binary format, and writes the binary format file in a local file of each slave server. The data written in each local file is combined on the HDFS. Each slave server reads the binary data from the HDFS in the MPI process and executes a principal component analysis.

Related techniques are disclosed in, for example, Japanese National Publication of International Patent Application No. 2013-545169 and Japanese Laid-Open Patent Publication No. 2011-150503.

However, with the above technique, the amount of communication tends to be large when reading data in the MPI process. Therefore, an overall processing efficiency tends to be deteriorated.

For example, each slave server of the distributed processing system writes an execution result of the MapReduce process in a local data node in accordance with an instruction of the name node. Each slave server combines the data written in the local file of each slave server on the HDFS. Thus, when a slave server executes the MPI process, an event occurs in which the slave server acquires data to be processed via a network. The data acquisition via the network is greatly affected by a bandwidth and load of the network, which may lead to a processing delay.

SUMMARY

According to an aspect of the present invention, provided is an apparatus for processing data. The apparatus includes a memory and a processor coupled to the memory. The processor is configured to acquire size information on a first size of first result data from a first node of a plurality of nodes. The first result data is generated in first distributed processing executed by the first node on a first part of first input data for the first distributed processing executed by the plurality of nodes. The processor is configured to acquire data arrangement information for second distributed processing executed by the plurality of nodes. The data arrangement information indicates an arrangement of second input data for the second distributed processing. The processor is configured to generate a data arrangement instruction on basis of the size information and the data arrangement information. The data arrangement instruction defines an arrangement pattern of second result data generated in the first distributed processing executed by the plurality of nodes and stored in the plurality of nodes as the second input data. The processor is configured to transmit the data arrangement instruction to the plurality of nodes.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

DESCRIPTION OF EMBODIMENTS

Embodiments of an apparatus and a method for processing data will be described with reference to the drawings. It should be, however, noted that the present disclosure is not limited by these embodiments.

First Embodiment

Figure 1:
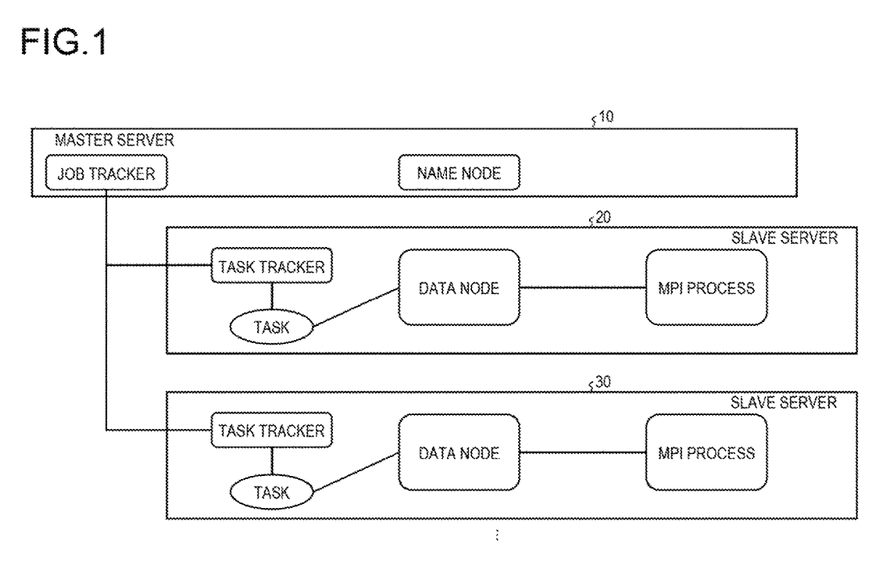
FIG. 1 is a diagram illustrating an exemplary configuration of a distributed processing system according to a first embodiment.

FIG. 1 is a diagram illustrating an exemplary configuration of a distributed processing system according to a first embodiment. As illustrated in FIG. 1, in this distributed processing system, a master server 10 and a plurality of slave servers such as a slave server 20 and a slave server 30 are communicably coupled to each other via a network such as the Internet.

As an example, this distributed processing system performs distributed processing of a MapReduce process on input data and then performs distributed processing of an MPI process on the result data of the MapReduce process. As an example of the input data, matrix data described with a character string in a CSV format is used herein. The input data is converted into matrix data in a floating point binary format by the MapReduce process. Then, a principal component analysis algorithm such as the MPI process is executed on the binary format matrix data.

In this distributed processing system, a distributed processing application using a distributed processing framework such as Hadoop® is executed in each server, and HDFS or the like is used as a base of data. In the Hadoop®, input data which tends to be a huge file is divided into units (hereinafter may also referred to as chunks) of, for example, 64 MB and is stored in a data node of the HDFS.

In the MPI process, an identifier (ID) called a rank is allocated to each slave server. For example, for computation with n parallel processes, one of ranks rank_0 to rank_n−1 is allocated to respective slave servers. In this embodiment, an example in which a principal component analysis is executed using a singular value decomposition function will be described. It is assumed that matrix data is divided into n equal blocks on a row basis such that rank_0 is in charge of the first block, and rank_n−1 is in charge of the last block.

The master server 10, which is a server that performs overall management of the distributed processing system, and functions as a job tracker and a name node in the MapReduce process. For example, the master server 10 identifies which data is stored in which slave server by using meta information or the like. The master server 10 manages tasks, jobs and the like to be allocated to the respective slave servers, and allocates tasks, such as a Map process and a Reduce process, to the respective slave servers. Further, the master server 10 notifies each slave server of a data node in which the result of the MapReduce process is to be stored.

The slave server 20 and the slave server 30 are servers that execute the Map process and the Reduce process, and function as data nodes, task trackers and job clients in the MapReduce process. Each of the slave servers executes a Map task allocated by the master server 10, calculates a hash value of a key in the Map task, and determines a Reduce task of a distribution destination depending on a value obtained by the calculation.

Thereafter, each slave server executes the Reduce task allocated to the master server 10, and stores result data in the data node on the HDFS designated by the master server 10. Then, each slave server reads the corresponding data from the HDFS in accordance with a rank allocated to its own server and executes the MPI process on the read data.

Figure 2:
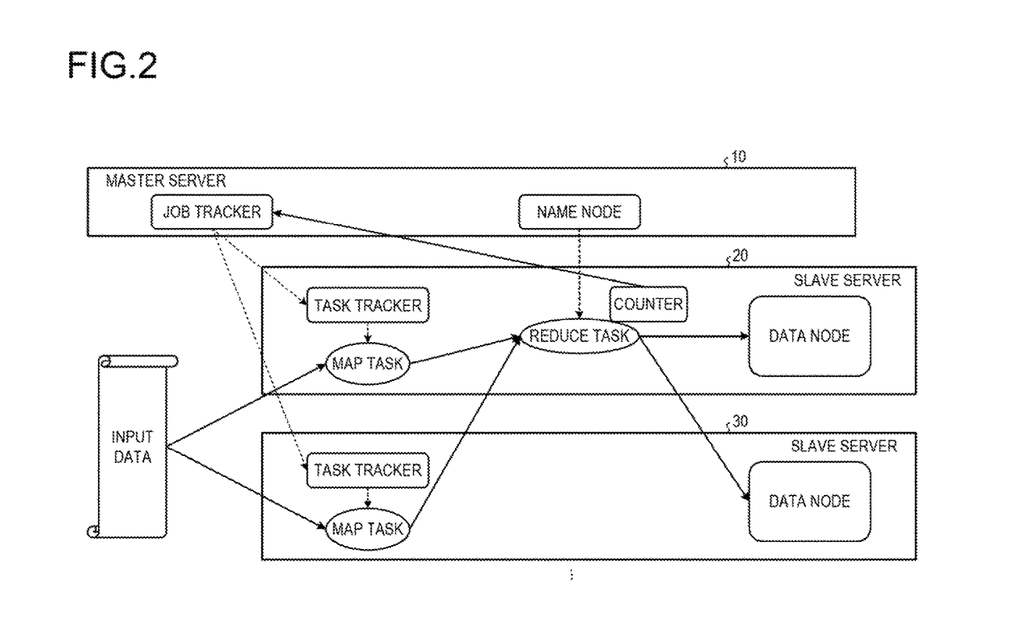
FIG. 2 is a diagram illustrating chunk allocation according to the first embodiment.

Next, an example of chunk allocation according to the first embodiment will be described. FIG. 2 is a diagram illustrating chunk allocation according to the first embodiment. As illustrated in FIG. 2, a job tracker of the master server 10 determines an allocation of the Map tasks and the Reduce tasks in accordance with the number of distributions designated in advance by an administrator or the like, and allocates the Map tasks to task trackers of the respective slave servers.

When executing the Map task, each slave server calculates a hash value of a key in the Map task, determines a Reduce task of the distribution destination in accordance with a value obtained by the calculation, and executes the Reduce task. Then, each slave server stores result data of the Reduce processing, that is, a chunk, in a data node designated by the name node of the master server 10.

Here, the master server 10 acquires size information on the size of result data, which is obtained by processing a part of the input data in the MapReduce process, from any one of the plurality of slave servers that are to execute the MapReduce process which is the first distributed processing. Then, the master server 10 acquires data arrangement information for the MPI process, in which data generated by the MapReduce process and stored in the plurality of slave servers is used as input data. Then, on the basis of the size information and the data arrangement information, the master server 10 generates and transmits, to the plurality of slave servers, a data arrangement instruction which defines an arrangement pattern of the data generated by each of the plurality of slave servers in the MapReduce process.

For example, the master server 10 acquires the amount of data written by each slave server in its local file, calculates the sum of the respective data amounts to obtain the data size of data to be obtained after the MapReduce process. The master server 10 divides the data size of data to be obtained after the MapReduce process by the number of slave servers and allocates a data area to each slave server (rank). For example, when the number of slave servers is 16, the master server 10 instructs each slave server such that a first chunk, which is included in the first 1/16 of the data file to be obtained after the MapReduce process from the head of the data file, is placed in the slave server 20, a second chunk included in the next 1/16 of the data file is placed in the slave server 30, and the like.

Specifically, the master server 10 counts the MapReduce processes for the input data, and acquires a result of the MapReduce process executed by the slave server 20 on data of a predetermined percentage (for example, 1%) of the input data. The master server 10 compares the data size of data before the MapReduce process with the data size of data after the MapReduce process, and calculates a data conversion rate in the MapReduce process. Then, the master server 10 multiplies the size of the entire input data by the data conversion rate, to calculate the data size of data to be obtained after the MapReduce process.

Thereafter, the master server 10 divides the data size of data to be obtained after the MapReduce process by the number of slave servers, and allocates a data area to each slave server (rank). For example, when the number of slave servers is 16, the master server 10 instructs each slave server such that a first chunk, which is included in the first 1/16 of the data file to be obtained after the MapReduce process from the head of the data file, is placed in the slave server 20, a second chunk included in the next 1/16 of the data file is placed in the slave server 30, and the like.

In this manner, the master server 10 acquires the data size of data after the MapReduce process, and arranges the data after the MapReduce process such that a chunk corresponding to a rank of the MPI process is placed in a slave server (node) corresponding to the rank. Therefore, the master server 10 may speed up the data reading in the MPI process to improve the processing efficiency.

Figure 3:
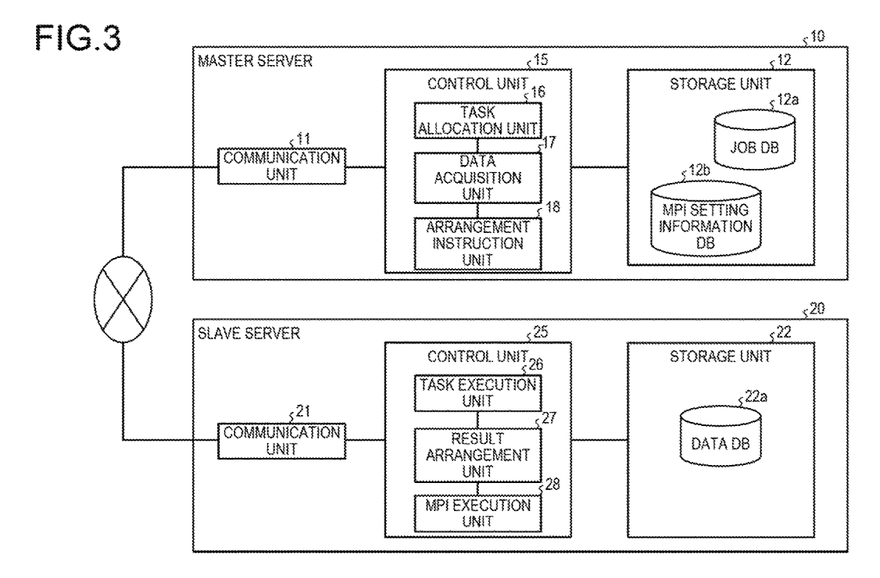
FIG. 3 is a diagram illustrating an exemplary functional configuration of the distributed processing system according to the first embodiment.

Next, functional configurations of the master server 10 and each slave server will be described with reference to FIG. 3. FIG. 3 is a diagram illustrating an exemplary functional configuration of the distributed processing system according to the first embodiment. Since the slave servers have similar configurations, descriptions will be given with the slave server 20 taken as an example.

As illustrated in FIG. 3, the master server 10 includes a communication unit 11, a storage unit 12 and a control unit 15. The communication unit 11 is a processing unit that controls communication with other devices regardless of whether it is wired or wireless. For example, the communication unit 11 transmits task allocation information, data arrangement information, various instructions, and the like to each slave server, and receives result data of a task from each slave server.

The storage unit 12 is a storage device that stores therein programs executed by the control unit 15, data used by the control unit 15 for processing, and the like, and is, for example, a memory, a hard disk or the like. The storage unit 12 stores a job database (DB) 12a and an MPI setting information DB 12b.

The job DB 12a is a database for storing job information of a job to be subjected to the distributed processing. For example, the job DB 12a stores therein "Job ID" as an identifier for identifying a job, "total number of Map tasks" as the total number of Map tasks included in the job, "total number of Reduce tasks" as the total number of Reduce tasks included in the job, and the like.

Further, the job DB 12a stores therein information on the Map tasks and the Reduce tasks. For example, the job DB 12a stores therein information identifying which Map task or Reduce task is allocated to which slave server, information indicating what kind of data is stored in which slave server, and the like.

The MPI setting information DB 12b is a database for storing the data arrangement information for the MPI process, that is, information on a data structure related to the data arrangement of input data for the MPI process. Specifically, the MPI setting information DB 12b stores therein information on data arrangement received by a name node from an MPI program.

For example, the MPI setting information DB 12b stores therein "target file name, division number, rank-in-charge table" and the like. The "target file name" indicates which file is passed from the MapReduce process to the MPI. The "division number" indicates the number of divisions of an input file input into the MPI. The "rank-in-charge table" is a correspondence table between each division and each rank value. For example, the "rank-in-charge table" is information indicating of which area of the input data the rank_0 is in charge, and the like, and stores "rank_0, the first ⅙ from the head" or the like. When the rank-in-charge table is omitted, rank_0, rank_1, rank_2, . . . are allocated in order from the head.

The MPI setting information DB 12b may also store therein more detailed information regarding the arrangement of data in the MPI. Specifically, the MPI setting information DB 12b may also store therein information on "Array Descriptor" (actually, an integer array of length 9) used by a matrix calculation package of MPI to express matrix arrangement inside the program.

For example, the MPI setting information DB 12b stores "DTYPE_A, CTXT_R, M_A, N_A, MB_A, NB_A, RSRC_A, CSRC_A, LLD_A" and the like. The "DTYPE_A" is a description for declaring a matrix. For example, when the "DTYPE_A" is 1, this indicates a dense matrix. The "CTXT_R" is a context handle of Basic Linear Algebra Communication Subprograms (BLACS) and includes the number of row nodes or the number of column nodes. The "M_A" indicates the number of rows in the entire matrix and the "N_A" indicates the number of columns in the entire matrix. The "MB_A" is a blocking factor for distributing rows and the "NB_A" is a blocking factor for distributing columns. The "RSRC_A" is a row coordinate of the first element on a local memory and the "CSRC_A" is a column coordinate of the first element on the local memory. The "LLD_A" is the size in the row direction that is held locally. For example, "LLD_A≥MAX (1, LOCr (M_A))".

In a matrix calculation package such as Scalable Linear Algebra PACKage (ScaLAPACK), collection of information on Array Descriptor of each node may indicate where to send elements of the matrix. In the matrix calculation package, since different nodes have different ways of holding data, information representing a node, such as a node number, a node position in the BLACS context handle, and the like, and the above-mentioned Array Descriptor, are collected in pairs from all nodes.

The control unit 15 is a processing unit that controls the overall operation of the master server 10, and is, for example, a processor or the like. The control unit 15 includes a task allocation unit 16, a data acquisition unit 17 and an arrangement instruction unit 18. The task allocation unit 16, the data acquisition unit 17 and the arrangement instruction unit 18 are examples of electronic circuits included in the processor or examples of processes executed by the processor.

The task allocation unit 16 is a processing unit that allocates a Map task and a Reduce task to each slave server and instructs each slave server to execute each task. Specifically, upon receiving an allocation request for a Map task from the slave server 20, the task allocation unit 16 allocates an unprocessed Map task to the slave server 20. Likewise, upon receiving an allocation request for a Reduce task from the slave server 20, the task allocation unit 16 allocates an unprocessed Reduce task to the slave server 20. Since the allocation of the Map task and the Reduce task is the same as the general MapReduce process, detailed description thereof will be omitted here.

The data acquisition unit 17 is a processing unit that acquires the data amount of data obtained by the MapReduce process. Specifically, the data acquisition unit 17 acquires the amount of data written by each slave server in the local file. That is, the data acquisition unit 17 acquires the data amount of data obtained by the MapReduce such that a chunk corresponding to a rank of the MPI process is placed in a slave server (node) corresponding to the rank.

For example, the arrangement instruction unit 18 acquires information indicating that the file size is "0.8 TB" from the data acquisition unit 17. Based on the information stored in the MPI setting information DB 12b, the arrangement instruction unit 18 identifies that the number of ranks is n, rank_0 and after are sequentially allocated to slave servers starting from the slave server 20, and rank_0 and after are sequentially allocated from the head of the input file. Then, the arrangement instruction unit 18 transmits, to each slave server, an arrangement instruction including the information of allocation of the ranks to the slave servers and a correspondence relationship between respective division areas of the input file and the ranks, and the like.

For example, the arrangement instruction unit 18 divides the file size of 0.8 TB into n pieces, and transmits, to each slave server, an instruction which defines that the n pieces are to be allocated with the respective rank by 1/n starting from the head. An example of the content of this instruction is that data within the first 1/n of a file generated by the MapReduce process is allocated to the slave server 20 having rank_0, data within the next 1/n is allocated to the slave server 30 having rank_1, and the like. That is, 0.8/n TB of the input file is assigned to each rank. The arrangement instruction unit 18 may monitor result data of each slave server to identify the data size of the result data, and determine the result data to be included in a chunk allocated with each rank so that the data falls within one chunk.

The control unit 15 receives the result of the MapReduce process from each slave server, and, when the overall MapReduce process is completed, instructs each slave server to start the MPI process. At this time, the control unit 15 transmits, to each slave server, rank allocation information for each slave server, storage destination information of the data corresponding to each rank, and the like, together. As the rank allocation information, information indicating which rank is allocated to which slave server is included in the form of "slave e process of each slave server. The data acquisition unit 17 calculates the total of data amounts acquired from the respective slave nodes as a file size, and outputs the file size to the arrangement instruction unit 18.

The arrangement instruction unit 18 is a processing unit that transmits to the plurality of slave servers, based on the information on the file size notified from the data acquisition unit 17 and the information stored in the MPI setting information DB 12b, a data arrangement instruction which defines an arrangement pattern of data to be stored on the HDFS. Specifically, the arrangement instruction unit 18 arranges the data after the MapReduce process server, allocation rank", for example, "slave server 20, rank_0". As the storage destination information, information indicating which rank data (chunk) is stored in which slave server is included in the form of "slave server, storage rank", for example, "slave server 30, rank_1".

As illustrated in FIG. 3, the slave server 20 includes a communication unit 21, a storage unit 22 and a control unit 25. The communication unit 21 is a processing unit that controls communication with other devices regardless of whether it is wired or wireless. For example, the communication unit 21 receives task allocation information, a data arrangement instruction, and the like from the master server 10, and transmits result data of task processing and the like to the master server 10.

The storage unit 22 is a storage device that stores therein programs executed by the control unit 25, data used by the control unit 25 for processing, and the like, and is, for example, a memory, a hard disk, or the like. The storage unit 22 stores therein a data DB 22a. The data DB 22a is a database that stores therein result data of the MapReduce processing and chunks, which are input data to MPI. That is, the data DB 22a corresponds to the function of the data node of each slave server.

The control unit 25 is a processing unit that controls the overall operation of the slave server 20, and is, for example, a processor or the like. The control unit 25 includes a task execution unit 26, a result arrangement unit 27, and an MPI execution unit 28. The task execution unit 26, the result arrangement unit 27, and the MPI execution unit 28 are examples of electronic circuits included in the processor or examples of processes executed by the processor.

The task execution unit 26 is a processing unit that executes a Map task or a Reduce task allocated to the slave server 20. Since a Map process, a Shuffle process and a Reduce process executed by the task execution unit 26 are the same as those of the general MapReduce process, detailed descriptions thereof will be omitted.

For example, when the Map task and the Reduce task are completed, the task execution unit 26 stores result data of the processing in the data DB 22a, which is a local file. Then, the task execution unit 26 extracts the amount of the stored data and notifies the extracted amount to the master server 10.

The result arrangement unit 27 is a processing unit that arranges the result of the MapReduce process, which is stored in the data DB 22a of the local file, in the HDFS in accordance with the data arrangement instruction from the master server 10. Specifically, based on the data arrangement instruction received from the master server 10, the result arrangement unit 27 identifies which rank is allocated to which slave server, which area of the input file is allocated with which rank (slave server), etc.

Then, the result arrangement unit 27 arranges the data after the MapReduce process such that a chunk corresponding to a rank of the MPI process is placed in a slave server (node) corresponding to the rank. For example, the result arrangement unit 27 controls to store the result of the MapReduce process such that data allocated with rank_0 is stored in a slave server corresponding to rank_0. A detailed example of the arrangement will be described later.

The MPI execution unit 28 is a processing unit that executes the MPI process after the MapReduce process. Specifically, the MPI execution unit 28 identifies the rank of its own device in accordance with the rank allocation information acquired from the master server 10. Then, in accordance with the rank allocation information acquired from the master server 10, the MPI execution unit 28 reads a chunk corresponding to the rank of its own device and executes the MPI process. The MPI execution unit 28 may transmit the result of the MPI process to the master server 10 and display the result on a display device or the like.

Figure 4:
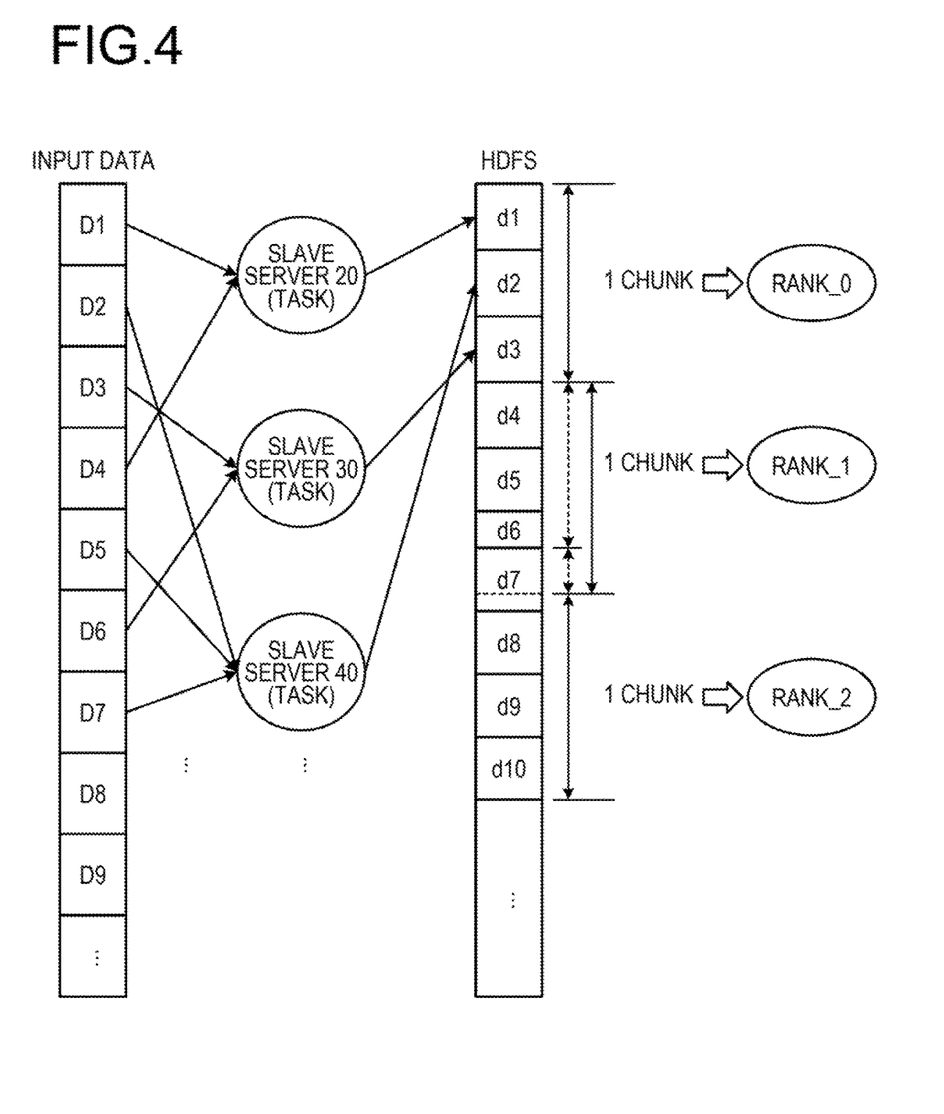
FIG. 4 is a diagram illustrating data arrangement.

Next, an example of data arrangement after the MapReduce process will be described. That is, how the chunks are stored in the MPI process will be described. FIG. 4 is a diagram illustrating data arrangement. It is assumed here that the ranks rank_0, rank_1 and rank_2 are allocated in order from the head of an input file. It is also assumed that the master server 10 has already predicted the size of a file to be subjected to the MPI process on the basis of a part of the input data and has already determined which region of the file is to be allocated with which rank (slave server).

As illustrated in FIG. 4, as a result of the task allocation by the master server 10, the slave server 20 executes the MapReduce process for input data D1 and D4. Likewise, the slave server 30 executes the MapReduce process for input data D3 and D6, and a slave server 40 executes the MapReduce process for input data D2, D5, and D7.

Then, each slave server stores the result data of the MapReduce process on the HDFS in order from the head of the input data. At this time, each slave server or the master server 10 may monitor the data size of each piece of the result data.

Thereafter, each slave server and the master server 10 identify that the result data d1, d2, and d3 that are the result data correspond to one chunk of about 64 MB. In addition, each slave server identifies that the result data d4, d5, d6, and a part of the result data d7 correspond to one chunk and that a part of result data d7 and result data d8, d9, and d10 correspond to one chunk.

As a result, the slave server 20 stores the result data d1 in the slave server 20 corresponding to rank_0, the slave server 30 stores the result data d3 in the slave server 20 corresponding to rank_0, and the slave server 40 stores the result data d2 in the slave server 20 corresponding to rank_0.

In addition, the slave server 20 stores the result data d4 in the slave server 30 corresponding to rank_1, the slave server 30 stores the result data d6 in the slave server 30 corresponding to rank_1, and the slave server 40 stores the result data d5 and a part of the result data d7 in the slave server 30 corresponding to rank_1.

As a result, the slave server 20 of rank_0 may read data from its own node during the MPI process. The slave server 30 of rank_1 may read most of the data from its own node and may read some of the data from another node (slave server 40) during the MPI process.

Figure 5:
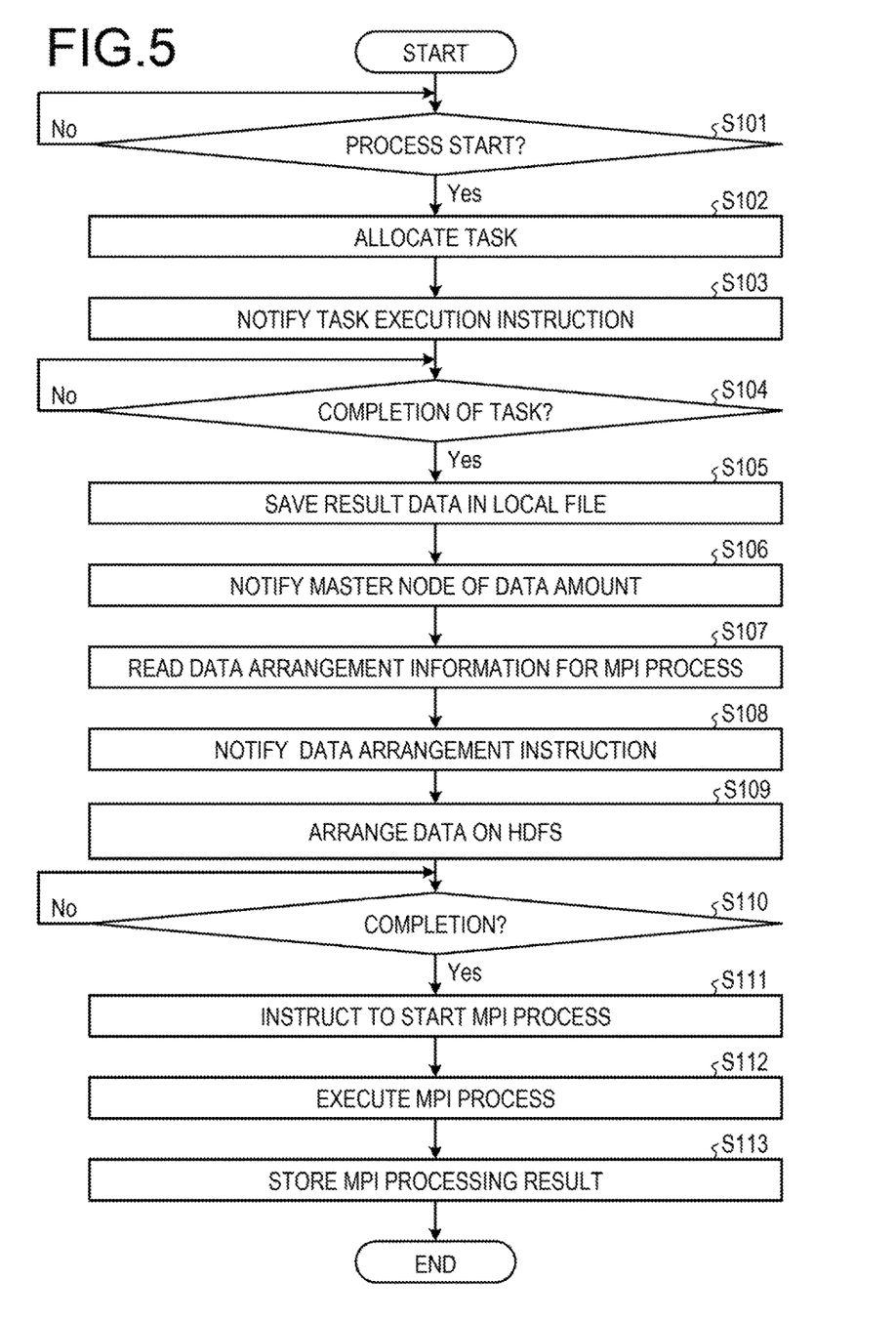
FIG. 5 is a flowchart illustrating a flow of a process executed by the distributed processing system.

FIG. 5 is a flowchart illustrating a flow of a process executed by the distributed processing system. As illustrated in FIG. 5, when it is determined that the process is started (Yes in S101), the task allocation unit 16 of the master server 10 executes task allocation to allocate a Map task and a Reduce task to each slave server (S102). Upon completing the task allocation, the task allocation unit 16 notifies each slave server of an instruction to execute the task (S103).

Thereafter, the task execution unit 26 of the slave server 20 executes the Map task and the Reduce task. When it is determined that the task is entirely completed (Yes in S104), the task execution unit 26 saves the result data in a local file (S105). Then, the task execution unit 26 notifies the master server 10 of the data amount of the result data, as the data amount of an input file (S106).

Then, the arrangement instruction unit 18 of the master server 10 reads data arrangement information for the MPI process from the MPI setting information DB 12b (S107). The arrangement instruction unit 18 generates a data arrangement instruction on the basis of the data arrangement information and the data amount of the input file for the MPI process, and notifies each slave server of the generated data arrangement instruction (S108).

Thereafter, the result arrangement unit 27 of each slave server arranges the data (result data of MapReduce), which is stored in the local file, on the HDFS in accordance with the data arrangement instruction notified from the master server 10 (S109). For example, the result arrangement unit 27 arranges the data after the MapReduce process in each slave server constituting the HDFS such that a chunk corresponding to a rank of the MPI process is placed in a slave server (node) corresponding to the rank.

When it is determined that the data arrangement is completed (Yes in S110), the control unit 15 and the like of the master server 10 instructs each slave server to start the MPI process (S111). At this time, the control unit 15 and the like of the master server 10 transmits information, in which a slave server, a rank, and a data storage destination are associated with each other, to each slave server.

Upon receiving this instruction, the MPI execution unit 28 of each slave server reads data corresponding to the allocated rank in accordance with the information indicating the slave server, the rank, and the data storage destination, which is notified from the master server 10 to execute the MPI process (S112). The MPI execution unit 28 of each slave server stores result data of the MPI process (S113).

As described above, since the distributed processing system according to the present embodiment determines a data node depending on the situation of the MPI side, there may be a high probability of remote writing. However, when there is a sufficient buffer, the remote writing may be thrown away and there is no need to keep the application waiting. Since the distributed processing system according to the present embodiment determines the data node depending on the situation of the MPI side, there may be a high probability of local reading in contrast to a case in conventional techniques, in which there may be a high probability of remote reading. Execution of an application is greatly affected by data reading since the execution is stopped until data arrives. Therefore, the cost reduction in the data reading may directly leads to improvement in the performance of the application. Therefore, the master server 10 may speed up the data reading in the MPI process and improve the processing efficiency.

Figure 6:
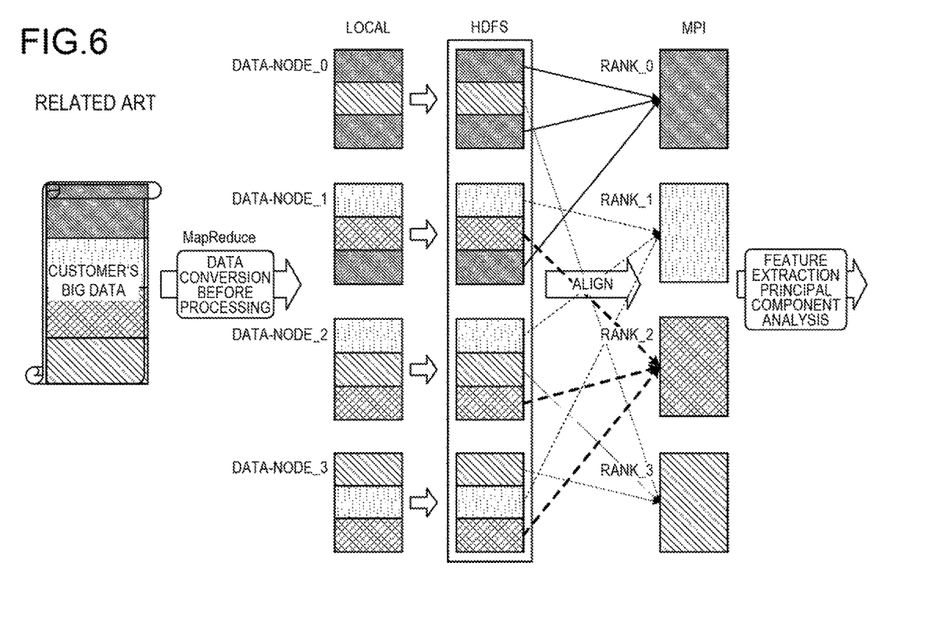
FIG. 6 is a diagram illustrating a conventional process.
Figure 7:
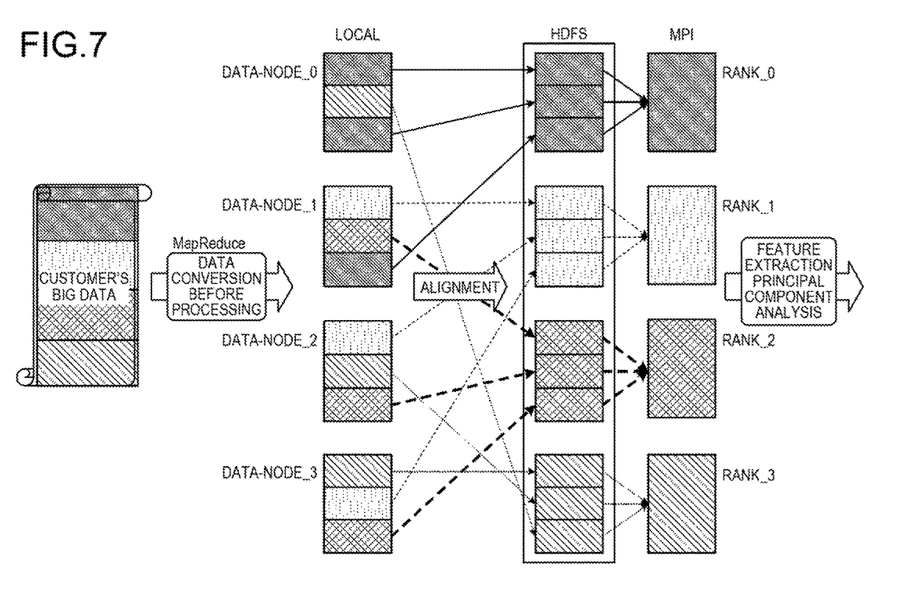
FIG. 7 is a diagram illustrating an arrangement result according to the first embodiment.

Here, a conventional technique and the first embodiment are compared to each other. FIG. 6 is a diagram illustrating a conventional process. FIG. 7 is a diagram illustrating an arrangement result according to the first embodiment. Here, it is assumed that the data conversion rate is 1. That is, the size of an input file to be subjected to the distributed processing is equal to the size of the input file for the MPI process. It is also assumed that the distributed processing is performed by four slave servers and the number of ranks is 4.

As illustrated in FIG. 6, conventionally, depending on the MapReduce process and without depending on the MPI process, result data of the MapReduce processing is stored in the local file of each slave server and then combined on the HDFS. Therefore, when the MapReduce process is executed by dividing customer's big data by 4, which is the number of ranks, a name node determines which data node stores therein which result data, regardless of the MPI process. That is, data to be processed is distributed such that data of rank_0 is stored across the slave servers 20 and 30, data of rank_1 is stored across the slave servers 30, 40, and 50, and the like.

Therefore, when executing the MPI process, each slave server of each rank executes a process of reading the corresponding chunk from another slave server. That is, alignment of chunks due to remote reading may occur frequently when reading from HDFS. The remote reading is not completed unless a chunk arrives, and an application that executes the MPI does not proceed to the following process unless the chunk reading is completed. As a result, since one chunk is read at a time, the influence on a processing time is large and a processing delay occurs accordingly.

In contrast, as illustrated in FIG. 7, according to the first embodiment, the result data of the MapReduce processing, which is written in the local file of each slave server, is rearranged in the HDFS depending on the MPI process. Therefore, when the MapReduce process is executed by dividing customer's big data by 4, which is the number of ranks, the name node may determine which data node stores therein which result data to be processed next, on the basis of the rank of the MPI process. That is, data of each rank may be stored in the same node. For example, data of rank_0 is stored in the slave server 20, data of rank_1 is stored in the slave server 30, and the like.

Therefore, when executing the MPI process, each slave server of each rank may read out the corresponding chunk from its own node and may accordingly reduce the remote reading. Since the chunks are aligned on the HDFS before the MPI process, each slave server may throw away the remote writing of the chunks as long as an intermediate buffer is sufficient. Therefore, since the application may execute the writing of the next chunk without waiting for the completion of writing of the current chunk, the influence on the processing time is small and the whole processing time may be accordingly shortened.

Second Embodiment

According to the first embodiment, each slave server writes the result data of the MapReduce processing in the local file and then rearranges the result data on the HDFS. However, depending on the type of distributed processing, each slave server may directly write the result data of the MapReduce processing, as it is, on the HDFS in some cases.

In this case, until the result data of the MapReduce processing in each slave server is written in the HDFS, the data amount of the result data is not identified. Therefore, the master server 10 is unable to determine a data arrangement instruction, which defines an arrangement pattern of data to be stored on the HDFS.

According to a second embodiment, the master server 10 predicts the amount of data obtained by the MapReduce processing performed by a slave node to determine an arrangement pattern of data on the HDFS.

For example, the data acquisition unit 17 of the master server 10 acquires size information on the size of the result data obtained by processing a part of the input data in the MapReduce process. Specifically, the data acquisition unit 17 records a data amount of the output file generated, for example, in the processing of the first 1% of the input file in the MapReduce process, and measures the ratio between the input amount and the output amount.

For example, the data acquisition unit 17 identifies that the data size of the input file is 1 TB on the basis of a file system or the like. Subsequently, the data acquisition unit 17 requests the slave server 20, which executes the MapReduce process for input data of 10 GB corresponding to about 1% of the input file, to transmit result data. That is, the data acquisition unit 17 transmits a transmission request of the result data to a slave server that processes data used for data prediction. At this time, the data acquisition unit 17 may also transmit information on the corresponding data, such as the data size, to the slave server 20.

For example, when the data size of the result data of the MapReduce processing is 8 GB, the data acquisition unit 17 calculates the ratio between the input amount and the output amount as 0.8. As a result, the data acquisition unit 17 calculates the file size to be input to the MPI process after MapReduce of the input file of 1 TB as "1 TB×0.8=0.8 TB". Then, the data acquisition unit 17 outputs the calculated file size of the input file for the MPI process to the arrangement instruction unit 18.

Similar to the first embodiment, the arrangement instruction unit 18 transmits to the plurality of slave servers, based on the information on the file size notified from the data acquisition unit 17 and the information stored in the MPI setting information DB 12b, a data arrangement instruction which defines an arrangement pattern of data to be stored on the HDFS.

In addition, upon receiving a request for the result data to be used for data prediction from the master server 10, the task execution unit 26 of the slave server 20 transmits a result of the corresponding MapReduce process to the master server 10. For example, when executing the MapReduce process on data in an area corresponding to 1% of the entire input file from the head of the input file, the task execution unit 26 transmits the result data to the master server 10.

After transmitting the result of the MapReduce process, which is used for the data prediction, the task execution unit 26 may re-execute from the beginning or from the rest depending on the type of the subsequent MPI process, the type of the input file, etc. The data acquisition unit 17 of the master server 10 may determine whether to start over from the beginning or the like depending on the type of the MPI process, the type of the input file, etc., and transmit the determination result to the corresponding slave server.

The example in which the size of the input file for the MPI process is not identified in advance has been described in the second embodiment. However, when the size of the input file for the MPI process is identified in advance, the ratio calculation may be omitted. When the ratio is about 1, the data arrangement may be controlled on the basis of the size of the input file of the MapReduce process.

Figure 8:
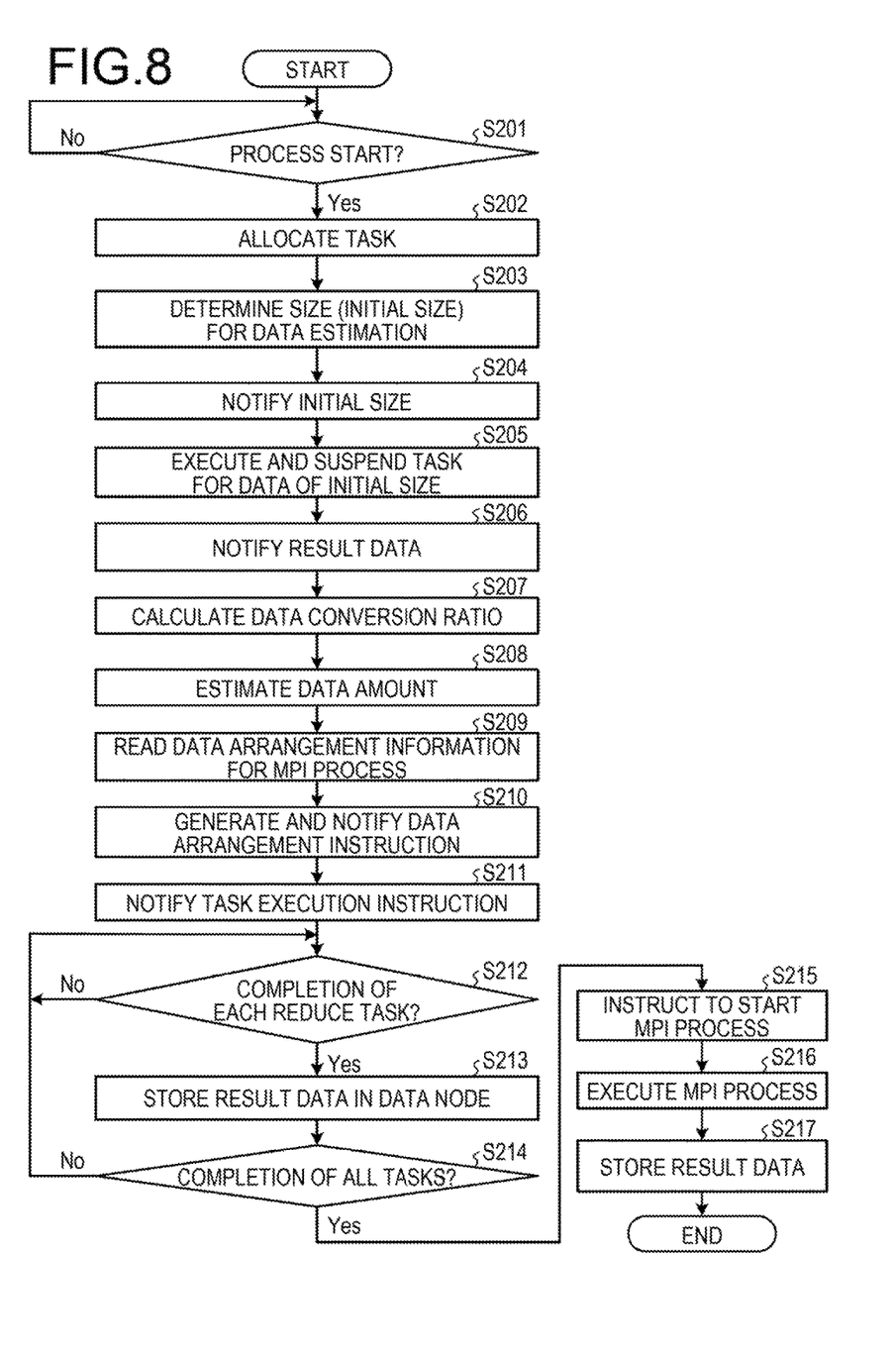
FIG. 8 is a flowchart illustrating a flow of a process according to a second embodiment.

Subsequently, a data prediction process according to the second embodiment will be described. FIG. 8 is a flowchart illustrating a flow of a process according to the second embodiment. As illustrated in FIG. 8, when it is determined that the process is started (Yes in S201), the task allocation unit 16 of the master server 10 executes task allocation to allocate a Map task and a Reduce task to each slave server (S202).

Subsequently, the data acquisition unit 17 of the master server 10 determines a size (initial size) for data prediction (S203) and notifies the corresponding slave server 20 of the initial size (S204).

Thereafter, the task execution unit 26 of the slave server 20 executes the Map task and the Reduce task. Upon completing the task for the data of the initial size, the task execution unit 26 suspends the execution of the task (S205). Then, the task execution unit 26 notifies the master server 10 of result data of the task for the data of the initial size (S206).

Then, the data acquisition unit 17 of the master server 10 calculates a data conversion ratio on the basis of the initial size and the data size of the result data (S207). Subsequently, the data acquisition unit 17 predicts the data amount of the input file for the MPI process on the basis of the data conversion ratio and the size of the input file (S208).

Thereafter, the arrangement instruction unit 18 of the master server 10 reads the data arrangement information for the MPI process from the MPI setting information DB 12b (S209), generates a data arrangement instruction on the basis of the data arrangement information and the data amount of the input file for the MPI process, and notifies each slave server of the generated data arrangement instruction (S210). Subsequently, the control unit 15 or the like of the master server 10 notifies the slave server 20 of the execution of the MapReduce task and the like that is suspended in S205 (S211).

When it is determined that the Reduce task is completed (Yes in S212), the result arrangement unit 27 of each slave server stores a task result in a data node (slave server) in accordance with the data arrangement instruction (S213).

When it is determined that the tasks of the MapReduce process allocated to each slave server are entirely completed (Yes in S214), the control unit 15 or the like of the master server 10 instructs each slave server to start the MPI process (S215). At this time, the control unit 15 and the like of the master server 10 transmits information, in which a slave server, a rank, and a data storage destination are associated with each other, to each slave server.

Upon receiving this instruction, the MPI execution unit 28 of each slave server reads data corresponding to the allocated rank in accordance with the information indicating the slave server, the rank, and the data storage destination which is notified from the master server 10 to execute the MPI process (S216). Thereafter, the MPI execution unit 28 of each slave server stores result data of the MPI process (S217).

Assuming that the distributed processing system discards the result data for the first 1% after obtaining it, the amount to be processed becomes 101% and the processing cost becomes high as much. The distributed processing system according to the present embodiment may control the data arrangement on the HDFS after predicting the data amount even in a system environment in which the data amount of the result data of the MapReduce processing is not identified. Therefore, the distributed processing system may improve the processing efficiency without depending on system environments and applications.

Other Embodiments

Although some embodiments of the present disclosure have been described so far, the disclosed technique may be implemented in various different modes other than the above-described embodiments.

The MPI process has been described by way of examples in the above embodiments, but the present disclosure is not limited thereto but may employ other principal component analyses. In addition, the input data is not limited to matrix data but may be data of other formats.

For example, there may be a case where a file generated by an application of the MapReduce process is input to a plurality of MPI applications. In that case, memory layouts in the MPI applications may differ from each other and allocation of chunks suitable for the MPI applications to data nodes may also differ from each other. HDFS may be set to have a plurality of copies of chunks for data security. Using that function, the plurality of copies may be respectively arranged to be suitable for the respective MPI applications. However, the plurality of copies are to be allocated to different servers so that they will not be lost due to a single server failure.

This may be problematic especially when rank_0 having the head of a matrix is allocated to the same server for a plurality of applications. Therefore, when considering a group of ranks by a name node, the arrangement of ranks may be determined such that chunk arrangements are different as possible, so that the rank_0 is allocated to a different server. For example, in a case of a MPI application App_A, the slave server 20 is allocated with rank_0, the slave server 30 is allocated with rank_1, and the slave server 40 is allocated with rank_2. In a case of a MPI application App_B, the slave server 20 is allocated with rank_2, the slave server 30 is allocated with rank_0, and the slave server 40 is allocated with rank_1. In this way, it is possible to limit a range to be influenced by a single server failure.

The example in which data of each rank is stored on each slave server has been described in the above embodiments, but the present disclosure is not limited to this example. Even if the data arrangement is controlled, depending on the size of data, data of the same rank may be stored across a plurality of slave servers. For example, when a part of the data of rank_0 cannot be stored, the slave server 20 stores data storing the part of the data of rank_0 in the slave server 30 corresponding to rank_1. Even in such a case, it is possible to reduce remote writing as compared with the conventional technique and hence improve the processing efficiency.

The example in which the data conversion ratio is other than 1 has been described in the above embodiments. However, when the size of the input file for the MPI process may be identified in advance, the process of data prediction may be omitted. When the data conversion ratio is 1, the data prediction process may be omitted. In this case, the master server 10 may control the data arrangement by dividing the input file for the MapReduce process by the number of ranks. In the above embodiments, the data arrangement is executed after the data is assembled once after the MapReduce process. However, since this data assembling may be omitted, the processing efficiency may be further improved.

Each component of each device illustrated in FIG. 3 is not necessarily physically configured as illustrated. That is, the components may be configured by being distributed or integrated in arbitrary units. For example, the data acquisition unit 17 and the arrangement instruction unit 18 may be integrated. All or some of processing functions executed in each device may be realized by a central processing unit (CPU) and a program analyzed and executed by the CPU, or may be realized as hardware by wired logic.

Among all the processes described in the embodiments, all or some of the processes described as being automatically executed may also be executed manually. Alternatively, all or some of the processes described as being executed manually may be automatically executed by a known method. The processing procedures, control procedures, specific names and information including various data and parameters described and illustrated in the description and the drawings may be arbitrarily changed unless that changes the processing result.

Figure 9:
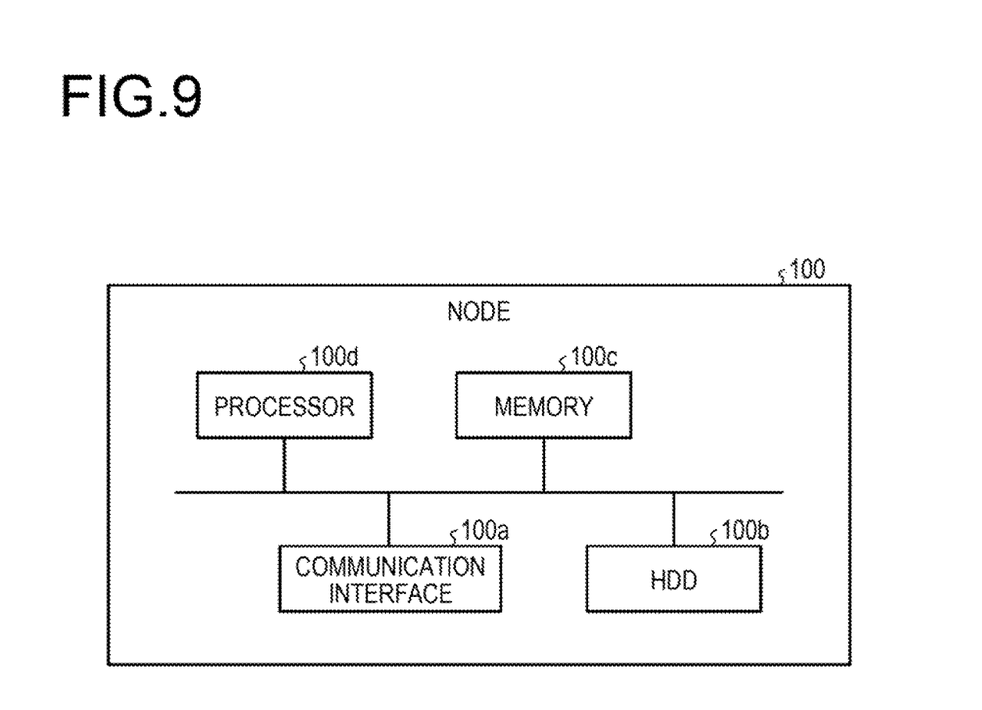
FIG. 9 is a diagram illustrating an exemplary hardware configuration.

The various processes described in the above embodiments may be realized by executing a prepared program by a computer. Hereinafter, one example of a computer that executes a program having the same function as the above embodiments will be described. Since the master server 10 and each slave server have a similar configuration, they will be described as a node 100 in this example. FIG. 9 is a diagram illustrating an exemplary hardware configuration.

As illustrated in FIG. 9, the node 100 includes a communication interface 100a, a hard disk drive (HDD) 100b, a memory 100c, and a processor 100d such as a CPU, all of which are coupled to each other via a bus.

The communication interface 100a corresponds to the communication control unit described above, such as, for example, a network interface card or the like. The HDD 100b stores therein a program for operating the processing units described above and a DB described in FIG. 3, etc.

The processor 100d reads, from the HDD 100b or the like, a program that executes a process of the processing unit described above and deploys the read program on the memory 100c to thereby operate the processes of executing the respective functions described in FIG. 3 and the like. That is, these processes execute the same functions as the task allocation unit 16, the data acquisition unit 17, and the arrangement instruction unit 18 of the master server 10. In addition, these processes execute the same functions as the task execution unit 26, the result arrangement unit 27, and the MPI execution unit 28 of the slave server 20.

In this manner, the node 100 operates as an information processing apparatus that executes a data processing method by reading and executing the program. The node 100 may also realize the same functions as the above-described embodiments by reading out the program from a recording medium by a medium reading device and executing the read program. It should be, however, noted that the program is not limited to being executed by the node 100. For example, the present disclosure may be equally applied to a case where another computer or server executes the program or a case where the node 100 and another computer or server executes the program in cooperation.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to an illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. An apparatus for processing data, the apparatus comprising:
a memory; and
a processor coupled to the memory and the processor configured to
execute first distributed processing on part of first input data to produce a plurality of first result data and store the plurality of first result data in a plurality of first data nodes, respectively;
acquire size information on a size of the plurality of first result data from one of the plurality of first data nodes,
acquire data arrangement information for second distributed processing performed on the plurality of first result data, a plurality of identifiers being allocated to the plurality of first data nodes, respectively, and the data arrangement information indicating a correspondence between a plurality of second data nodes and the plurality of the first result data to be respectively stored in the plurality of second data nodes, as a plurality of second result data,
generate a data arrangement instruction based on the size information of the size of the plurality of first result data and the data arrangement information for the second distributed processing, the data arrangement instruction defining an arrangement pattern of the plurality of second result data stored in the plurality of second data nodes, respectively as second input data for the second distributed processing,
transmit the data arrangement instruction to each of the plurality of second data nodes such that the plurality of second result data are stored in a predetermined file size unit defined as a chunk and a plurality of chunks corresponding to the plurality of identifiers is stored in the plurality of second data nodes, respectively; and
execute the second distributed processing to read out the plurality of chunks corresponding to the identifiers from the plurality of second data nodes, respectively.

2. A non-transitory computer-readable recording medium having stored therein a program that causes a computer to execute a process, the process comprising:
executing first distributed processing on part of first input data to produce a plurality of first result data and store the plurality of first result data in a plurality of first data nodes, respectively;
acquiring size information on a first size of the plurality of first result data from one of the plurality of first data nodes;
acquiring data arrangement information for second distributed processing performed on the plurality of first result data, a plurality of identifiers being allocated to the plurality of first data nodes, respectively, and the data arrangement information indicating a correspondence between a plurality of second data nodes and the plurality of the first result data, to be respectively stored in the plurality of second data nodes as a plurality of second result data;
generating a data arrangement instruction based on the size information of the first size of the plurality of first result data and the data arrangement information for the second distributed processing, the data arrangement instruction defining an arrangement pattern of the plurality of second result data stored in the plurality of second data nodes, respectively as second input data for the second distributed processing;
transmitting the data arrangement instruction to each of the plurality of second data nodes such that the plurality of second result data are stored in a predetermined file size unit defined as a chunk and a plurality of chunks corresponding to the plurality of identifiers is stored in the plurality of second data nodes, respectively; and
executing the second distributed processing to read out the plurality of chunks corresponding to the identifiers from the plurality of second data nodes, respectively.

3. The non-transitory computer-readable recording medium according to claim 2, wherein the arrangement pattern of the second result data indicates a correspondence between a plurality of third data nodes and the plurality of second result data to be respectively stored in the plurality of third data nodes.

4. The non-transitory computer-readable recording medium according to claim 2, the process further comprising:
calculating a first ratio between the first size of the plurality of first result data and a second size of the part of the first input data;
calculating a third size of the second result data based on the first ratio and the second size of the first input data; and
defining the arrangement pattern based on the third size of the second result data and the data arrangement information.

5. The non-transitory computer-readable recording medium according to claim 4, the process further comprising:
dividing the third size of the second result data by a number of the plurality of second data nodes to obtain the predetermined file size; and
defining the arrangement pattern such that the second result data is divided into a plurality of segments each having the predetermined file size and the plurality of segments are allocated to the plurality of second data nodes, respectively.

6. A method for processing data using slave servers connected to a master server via a network, the method comprising:
executing first distributed processing by the slave servers on part of first input data to produce a plurality of first result data and store the plurality of first result data respectively in first data nodes of the slave servers;
acquiring, by a computer, size information on a size of the plurality of first result data from one of the slave servers;
acquiring data arrangement information for second distributed processing executed by the slave servers with identifiers respectively allocated to the slave servers, the data arrangement information indicating a correspondence between a plurality of second data nodes and the plurality of the first result data, to be respectively stored in the plurality of second data nodes as a plurality of second result data;
generating a data arrangement instruction based on the size information of the size of the plurality of first result data and the data arrangement information for the second distributed processing, the data arrangement instruction defining an arrangement pattern of the plurality of second result data stored in the plurality of second data nodes of the slave servers, respectively as the second input data for the second distributed processing;

transmitting the data arrangement instruction to each of the slave servers;

storing the plurality of second result data, based on the data arrangement instruction in a predetermined file size unit defined as a chunk with a plurality of chunks respectively corresponding to the identifiers, in the plurality of second data nodes respectively corresponding to the slave servers; and executing the second distributed processing to read out the plurality of chunks corresponding to the identifiers from the plurality of second data nodes of the slave servers, respectively.

* * * * *